March 10, 1970 M. E. MIKRUT 3,499,515

MODULAR ELECTRICAL KEYBOARD

Filed Dec. 11, 1967 6 Sheets-Sheet 1

INVENTOR
MICHAEL E. MIKRUT
BY
Louis Orenbuch
ATTORNEY

March 10, 1970 M. E. MIKRUT 3,499,515

MODULAR ELECTRICAL KEYBOARD

Filed Dec. 11, 1967 6 Sheets-Sheet 2

INVENTOR.
MICHAEL E. MIKRUT
BY
Louis Orenbuch
ATTORNEY

March 10, 1970 M. E. MIKRUT 3,499,515

MODULAR ELECTRICAL KEYBOARD

Filed Dec. 11, 1967 6 Sheets-Sheet 3

INVENTOR.
MICHAEL E. MIKRUT
BY
Louis Orenbuch
ATTORNEY

INVENTOR.
MICHAEL E. MIKRUT
BY
Louis Orenbuch
ATTORNEY

MODULAR ELECTRICAL KEYBOARD

INVENTOR.
MICHAEL E. MIKRUT
BY Louis Orenbuch
ATTORNEY

INVENTOR
MICHAEL E. MIKRUT
BY
Louis Orenbuch
ATTORNEY

United States Patent Office 3,499,515
Patented Mar. 10, 1970

3,499,515
MODULAR ELECTRICAL KEYBOARD
Michael E. Mikrut, Littleton, Mass., assignor, by mesne assignments, to Synergistics, Inc., East Natick, Mass., a corporation of Massachusetts
Filed Dec. 11, 1967, Ser. No. 689,602
Int. Cl. B41j *5/12, 25/02, 29/00;* G06c *7/02*
U.S. Cl. 197—98 4 Claims

ABSTRACT OF THE DISCLOSURE

A modular keyboard has keys that are basically identical in construction to permit the positions of the keys to be changed or arranged as desired on the keyboard. Each key has a plurality of contacts and employs an electrically insulative mask which determines the electrical code that is generated by the keys actuation. The contacts of the keys are connected by solderless connections to the output terminals of the keyboard by parallel wires carried on insulative strips.

This invention relates in general to apparatus for enclosing information in the form of electrical signals and more particularly pertains to a keyboard for generating binary coded electrical signals upon the actuation of the keys.

DISCUSSION OF THE PRIOR ART

Conventional electrical encoding devices employ code keys or code switches that are assembled into a final configuration that cannot be readily altered because soldered connections are used. Careful soldering techniques are essential to the reliability of the conventional encoding devices because the terminals of the keys or switches are so close together that excess solder may easily form a bridge between terminals. Moreover, an excess of solder flux can form a film on the contacts of the keys or switches and prevent good electrical connection from being made between the contacts when the keys or switches are actuated. The alcohol rinse that is generally used to remove the excess solder flux is not always effective because the rinse may carry flux residue into vital contact areas that were not otherwise exposed to the solder flux. In addition, the heat employed during soldering may adversely affect the operation of the keys or switches and prolonged heating may result in damage to the insulators and to the wiring.

The conventional encoding keyboard has its keys in fixed positions in the assemblage and the keyboard is constructed to generate only one code. Because the keys are fixed in position, each key in the conventional keyboard is constructed to generate only its own code identifying signals. To alter a key to cause it to produce some other coded signal generally is not an easy task as it usually requires a change in soldered connections. Hence, the conventional keyboard is inflexible and is not readily adaptable to uses where interchangability of encoding keys or a change in the code is required.

OBJECTIVE OF THE INVENTION

The principal objective of this invention is to provide an improved encoding keyboard which permits flexibility in altering the code and allows the encoding keys to be readily interchanged.

THE INVENTION

The invention resides in a modular keyboard having keys that are basically of the same construction. The keys are electrically connected to the keyboard's output terminals by parallel wires secured in electrically insulative strips that are held in a rigid frame. The code contacts of each key have protruding tips and each tip is embedded in, or resistance welded to, a different wire of a strip so that soldered connections are entirely avoided. Each key employs an electrically insulative mask that fits over the key's code contacts. The mask, by permitting electrical connections to be made with the exposed contacts and prevailing connection from being made with the others, determines the electrical code that is generated by the key's actuation. Each key has a cap upon which an identifying symbol may be marked. The cap carries a stem that is engaged by a latch on the frame. By disengaging the latch, the key cap and mask can be removed to another location on the keyboard. Thus, the position of any key can be changed by transferring the mask and the keys identifying symbol to another key position.

THE DRAWINGS

The invention, both as to its construction and its mode of operation, can be better understood from the exposition which follows when it is considered in conjunction with the accompanying drawings in which.

THE EXPOSITION

Figure 1:
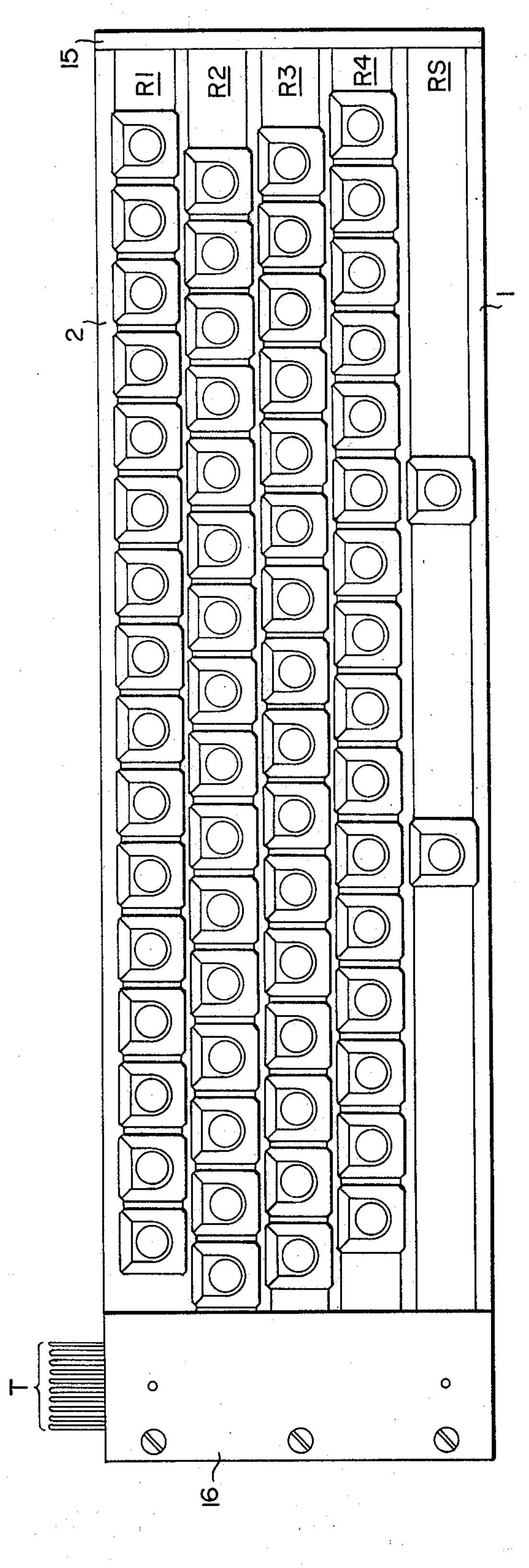
FIG. 1 is a top plan view of the assembled keyboard.

Referring now to FIG. 1, there is shown an assembled modular keyboard having keys arranged in rows R1, R2 . . . R5 within a frame. The keys are positioned within the frame so that the keys of one row are not in alignment with the keys of adjacent rows. The rows of keys, however, can be laterally shifted to obtain any desired arrangement within the confines of the frame. The electrically coded output of the keyboard is obtained from the terminal T. For purposes of exposition, the terminal is shown as having ten prongs.

Figure 2:
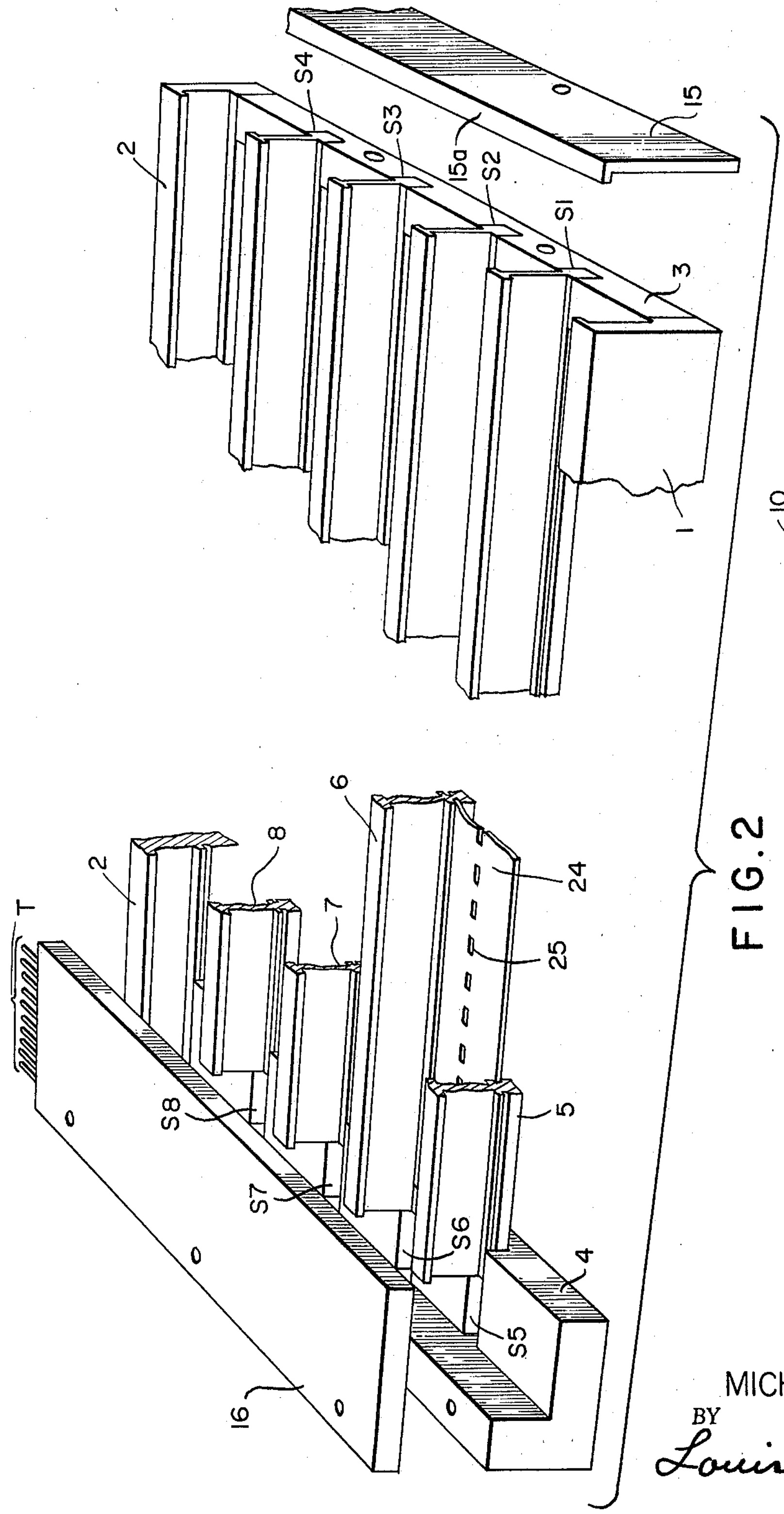
FIG. 2 is an exploded view showing elements of the keyboard frame.

The keyboard frame is shown in the exploded view of FIG. 2 and employs a front member 1 and a rear member 2 which are attached to lateral members 3 and 4 by screws to form a rectangular enclosure. Lateral member 3 has four slots S1, S2, S3 and S4 to accommodate the rails 5, 6, 7, 8 and lateral member 4 is, for the same purpose, provided with four slots S5, S6, S7 and S8.

Figure 3:
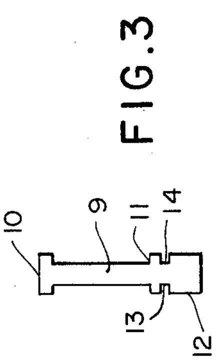
FIG. 3 is a cross-section of a rail employed in the frame.

Rails 5, 6, 7, 8 are identical in cross-section and span the distance between lateral members 3 and 4. As shown in FIG. 3, the rail has a web 9 which with an upper flange 10 and a lower flange 11 forms an I-bar. The lower portion of the rail is constituted by a base 12 which is shaped to fit within the slots S1, S2 . . . S8 in the lateral frame members 3 and 4. The base has in it opposed longitudinal grooves 13 and 14.

Figure 4:
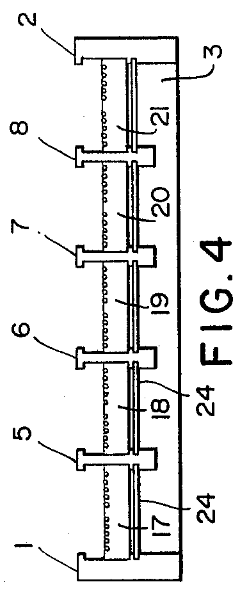
FIG. 4 is an end view of a partially assembled frame.

A cross sectional view of the front and rear frame members 1 and 2 is depicted in FIG. 4. The front and rear members are essentially rails that have been split in half longitudinally and whose bases have been elongated to permit them to be fastened to the lateral members.

With the rails positioned in the slots in members 3 and 4 and with the front and rear members assembled thereon, five ways are formed, as indicated in FIG. 4 to retain the rails in the assembly, an end member 15, shown in FIG. 2, is secured to lateral member 3 and is provided with a lip 15*a* which extends over the rails to lock them in position. At the left side of the frame, the rails are locked in position by a plate 16 that extends over the rails.

Positioned within the ways of the frame are wirestrips 17, 18, 19, 20 and 21, as depicted in the view of FIG. 4. The wirestrips are identical in construction and a portion of one of them is depicted in detail in FIG. 7. The wirestrip, essentially is an elongate, electrically insulative member of rectangular cross section. Ten parallel grooves extend along the entire length of the strip. The grooves are arranged in two groups of five, the groups being disposed on opposite sides of the strip's center. Into each groove is pressed an electrically conductive wire W1, W2 . . . W10 which is preferably of the kind having strands. To insulate the exposed surfaces of the wires, the wires are coated with an electrically insulative film 22. At regular intervals along the longitudinal center of the wirestrip, it is perforated by rectangular slots 23.

Figure 5:
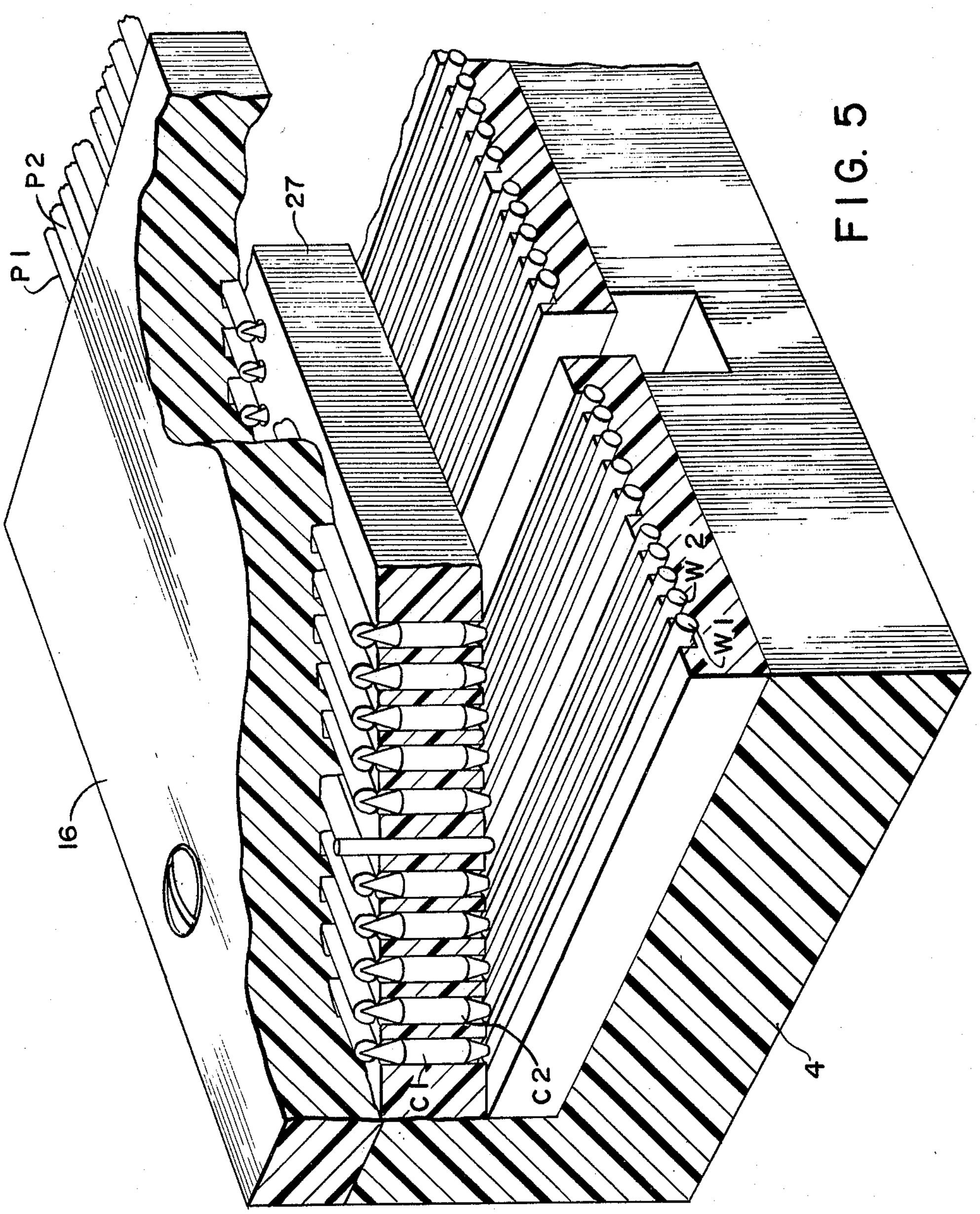
FIG. 5 is a cross-sectional view showing the connection of the wires in the wirestrips to the output terminals.

At the left side of the FIG. 1 keyboard, all the W1 wires of the wirestrips are electrically connected to one of the prongs of terminal T, all the W2 wires of the wirestrip are electrically connected to another of the prongs at terminal T, and so forth, whereby each wire in a wirestrip is electrically connected to one of the prongs at terminal T. The prongs, as indicated in FIG. 5, are extensions of wires that are pressed into parallel grooves in the plate 16. The wires in the wirestrips 17, 18, 19, 20 and 21 are connected to the wires in plate 16 by connector pins that are held in a retainer plate 27 shown in FIG. 5. A connector pin is pointed at both its ends and the pins are so disposed that, as shown in FIG. 5, each connector pin in the assembled keyboard has one end embedded in a wire of the plate 16 and its other end embedded in a wire of a wirestrip. In FIG. 5, connector pin C1 connects wire W1 of keystrip 17 to terminal prong P1, connector pin C2 connects wire W2 to terminal prong P2, etc. In a similar manner, the W1, W2 . . . W10 wires of the other wirestrips are connected to prongs P1, P2 . . . P10 respectively.

Figure 6:
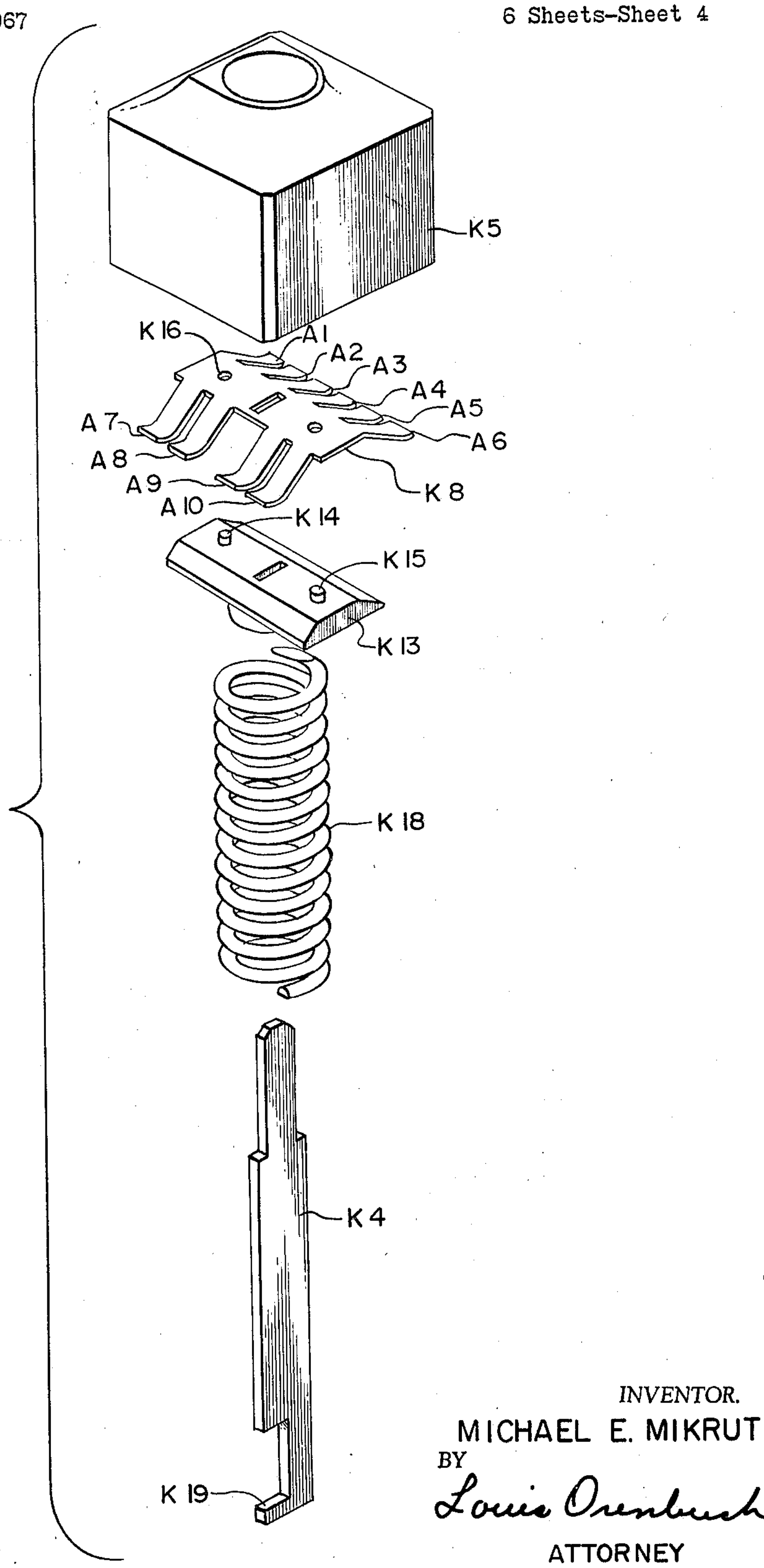
FIG. 6 is an exploded view of a key employed in the keyboard.
Figure 7:
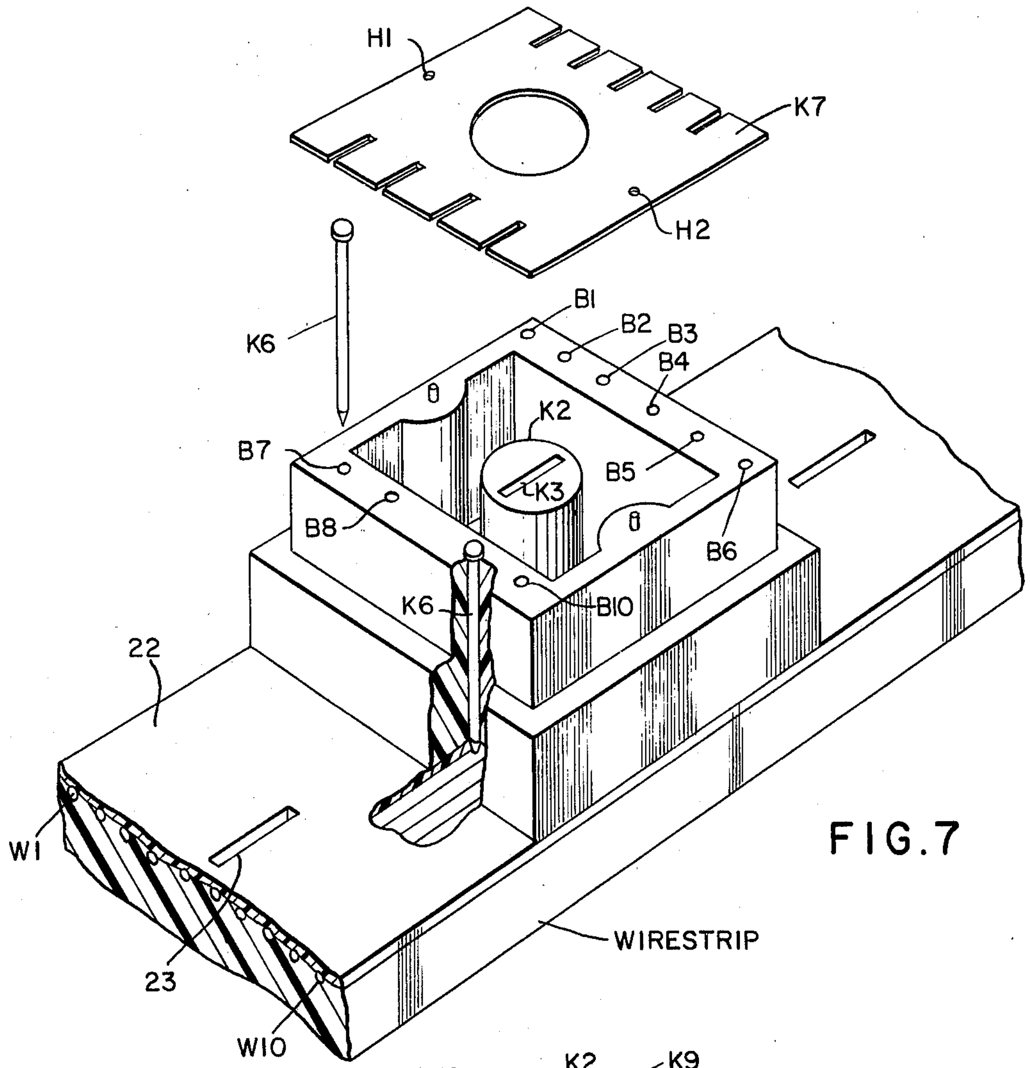
FIG. 7 is a view of the base for the key.
Figure 9:
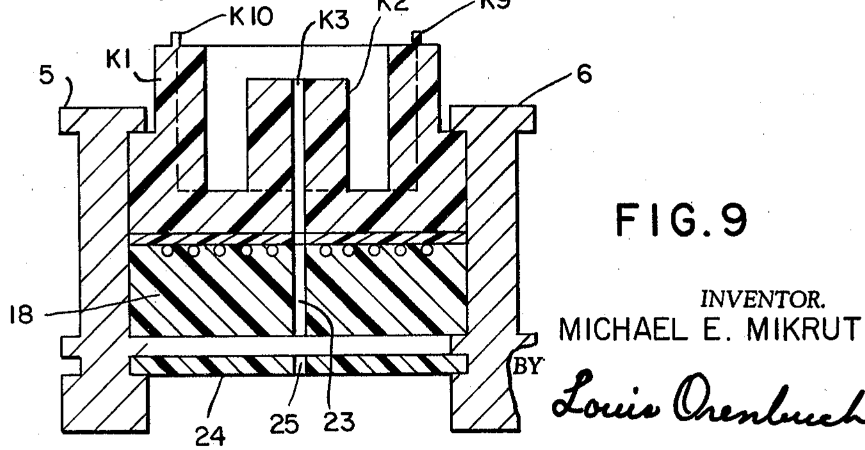
FIG. 9 is a view showing the key base held in the frame.
Figure 8:
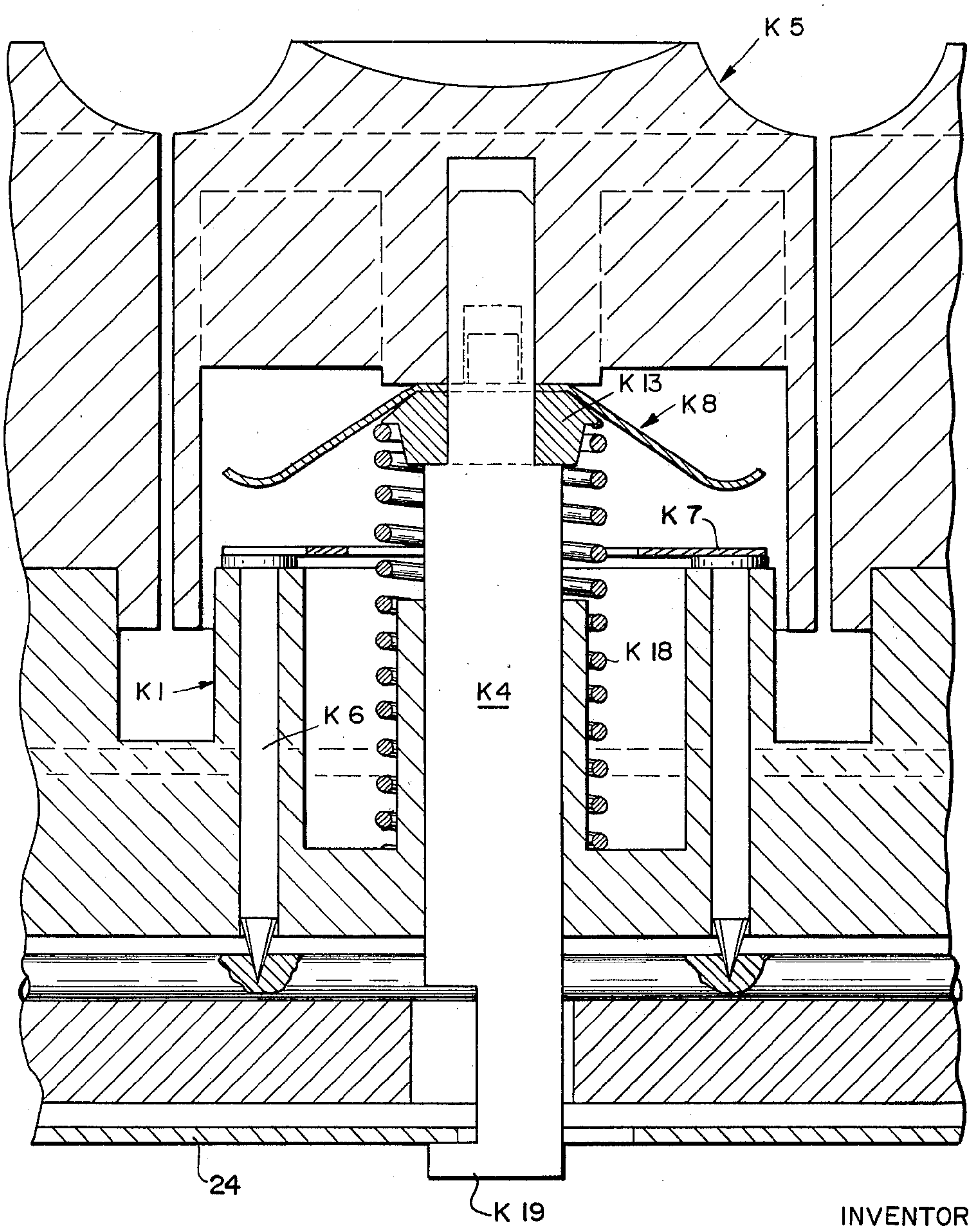
FIG. 8 is a sectional view of an assembled key.

As the keys, except for a code mask, are identical, the key depicted in FIGS. 6, 7, and 8 is illustrative of all keys. The key employs a rectangular base K1 (FIG. 7) whose lower portion fits between the rails of the frame and whose upper part is reduced in width to pass between the flanges of the rails as shown in FIG. 9. The base K1 is constructed of an electrically insulative material and has a center post K2 in which there is a slot K3 for receiving the stem K4 that extends from the cap K5 of the key. In the walls of the base K1 are bores B1, B2 . . . B10 for receiving contact pins K6. The pins extend vertically through the bores in the walls and when a pin is in its final position, the head of the pin rests upon the upper surface of the wall and the point of the pin protrudes below the base. Each pin is intended to provide an electrical contact to a different one of the wires embedded in a wirestrip and each key is therefore provided with ten pins. To insure adequate spacing between the pins, the two walls of the base which are transverse to the wirestrip are employed and the bores in one wall are staggered in relation to the bores in the other wall. A code mask K7 (FIG. 7) can be secured to the base to mask any of the pins and prevent an electrical connection being made with a finger of the spring contactor K8 which is carried by the cap K5. To reain the code mask in a fixed position, the code mask, as shown, in provided with two holes H1 and H2 which fit over locating pins K9 and K10 carried upon opposed pilasters K11 and K12 of the base. When the mask is positioned on the base, the locating pins K9 and K10 can be deformed to provide heads that prevent removal of the mask. The code mask is an electrical insulator which covers those pins that are to be masked while permitting the other pins to remain exposed. In its simplest form, the code mask is formed with tabs which can be broken off to form the desired code for the key.

The key cap K5 is essentially a hollow rectangular shell which fits over the upper portion of the base K1. Within the cap is secured the stem K4 which extends through a slot in the spring contactor K8. The contactor is retained in position by a keeper K13 which is cemented or otherwise fastened to the cap. For that purpose the keeper K13 is provided with posts K14 and K15 which extend through apertures K16 and K17 in contact K8. The posts K14 and K15 are pressed or cemented into apertures in the cap.

Spring contactor K8 carries ten resilient arms A1, A2 . . . A10 which are disposed to bear upon the ten pins in the base when the key cap is depressed. The interposition of the code mask permits the resilient arms to make electrical contact only with those pins that are not covered by the mask. The stem K4 extends through post K2 and protrudes from the bottom of the base. In the assembled key (FIG. 12), a return spring K18 is disposed around post K2 and the upper end of the spring encircles the hub of the keeper. The spring acts to return the cap to its initial position where the fingers of contactor K8 are out of contact with the pins. To prevent complete separation of the cap from the base, the lower portion of the stem is indented to provide a lip K19 which can be engaged by a retaining member. The indentation of the stem permits vertical movement of the key cap and spring K18 acts to return the key to its initial position when the key is actuated.

The key base K1 has been described as being a separate member. For ease of assembly, however, a plurality of key bases can be molded in a strip. For example, the strip may have bases for 16 keys. Where less than 16 keys for a row are desired in the keyboard, the excess bases are discarded by severing them from the strip. By molding the bases in a strip, a uniform spacing between keys is assured.

The key base, as shown in FIG. 9, sits upon the wirestrip and when it is properly positioned, the K6 pins are driven down into the wires of the wirestrip. The key caps are then inserted so that the stems protrude through the slots in the wirestrips. While all the keys in a row are depressed, a lock plate 24 is moved to the right, as viewed in FIG. 8, to prevent withdrawal of the key caps.

The lock plate 24, shown in FIG. 1, is constituted by a sheet of material that is sufficiently thin to enable it to slide in the grooves 13 or 14 (FIG. 3) of the rails. The lock plate is provided with slots 25 to accommodate the stem K4 of the key. The slots 25 are spaced along the lock plate to register with the slots K3 in the base strip. When assembled on the frame, as shown in FIG. 9, lock plate 24 is disposed below the wirestrip 17 upon which the base K1 sits. In that assemblage, the slot K3 of the base and slot 23 of the wirestrip are initially aligned with slot 25 in the lock plate to permit the key stem K4 (FIG. 8) to protrude below the lock plate. The lock plate is then moved along the rails to prevent the removal of the key stem K4 by obstructing the passage of lip K19 of the stem. The lock plate can be urged to its locking position by a spring or the plate can be held in its locking position by fastening it to the wirestrip by a screw.

On actuating the key, the arms of spring contactor K8 are pressed upon the pins K6. Assuming that when the key is actuated, the stem K4 contacts a power line and thereby connects the spring contactor to a source of electrical power, and electrical signal is impressed upon those wires of the wirestrip that are connected to unmasked pins whereas those wires that are connected to masked pins remain electrically unenergized. Thus, upon depressing a key, each of the ten wires of the wirestrip is either electrically energized or unenergized, depending upon the mask in the key. Deeming electrically energized wire to be a binary ONE, an unenergized wire is then a binary ZERO. The electrical state of the wires of the wirestrip thereby constitute a binary code that can be obtained from the terminals T of the keyboard.

In the common keyboard there is rarely a requirement for more than 64 keys. A binary code having seven bits in therefore sufficient to identify any of the 64 keys. Thus where each prong at terminal T (FIG. 1) can deliver one bit in the binary code, only seven prongs need be employed. The other three prongs may then be employed for other purposes. For example, one prong may provide a parity bit, another prong may be employed to carry electrical power and yet another prong may be employed to "strobe" the output.

The symbol for a key can be molded or engraved upon the face of the key cap itself or the symbol can be made as a separate part that can be detached from the key cap. To change the electrical code generated by a key, only the code mask need be changed and where the symbol is detachable from the key cap, a new identifying symbol may be readily attached to the cap.

In FIG. 1, the two keys in row R5 may both generate the same code. For example, where the keyboard is used in a teletypewriter system, the code generated by the two keys may designate a space. For convenience, the two keys may be bridged by a bar so that they are simultaneously actuated by pressure upon the bar.

Although the keyboard of FIG. 1 has been illustrated as having five rows of keys, it is apparent that the keyboard can readily be modified to accommodate less or more rows, as desired. Moreover, the wirestrips and rails can be lengthened or shortened in accordance with the number of keys that are desired in a row.

The interconnection of the wires of the wirestrips by the connector pins in retainer plate 27 need not be made at one end or the other of the keyboard but can be made at any intermediate place on the keyboard where it is desired to locate the output terminals T. If more than one output terminal is wanted, additional retainer plates, similar to plate 27, can be employed to provide the additional output terminals.

What is claimed is:

1. A modular keyboard comprising (A) a wirestrip carrying a plurality of parallel common conductors, (B) a plurality of keys disposed along the wirestrip, the common conductors having electrical connections to the plurality of keys whereby any of those keys, when separately actuated, is capable of providing signal paths to all the common conductors, each key comprising (a) a base having a plurality of contact pins, each contact pin having an exposed head and having its other end connected to a different common conductor of the wirestrip, (b) a cap mounted for movement relative to the base, the cap carrying a contactor spring having a plurality of arms disposed to bear upon the heads of the contact pins when the cap is moved toward the base, (c) resilient means normally holding the cap in a position where the arms of the contactor spring do not bear upon the contact pins, the resilient means permitting the cap to be moved toward the base, (C) and an electrically insulative code mask for each key, the code mask permitting the arms of the contactor spring to make electrical contact only with the unmasked pins when the key cap is moved toward the base.

2. A modular keyboard according to claim 1, wherein the wirestrip has a separate common conductor for each contact pin in the key base and the contact pins protrude below the base and have pointed ends extending into the common conductors of the wirestrip.

3. A modular keyboard according to claim 1, further comprising, (D) a frame holding a plurality of wirestrips in parallel relation, each wirestrip carrying the same plurality of common conductors whereby each common conductor of a wirestrip has a corresponding conductor on every other wirestrip, and (E) a terminal wirestrip transverse to the plurality of parallel wirestrips, the terminal wirestrip having parallel conductors and pins extending therefrom into the common conductors on the parallel wirestrips whereby corresponding common conductors are exclusively connected to the same terminal wirestrip conductor, the pins having pointed ends embedded in the common conductors and being disposed at the crossings of the terminal wirestrip conductors with the common conductors.

4. A modular keyboard according to claim 3, wherein the cap of each key further includes, a stem secured to the cap, the stem protruding through apertures in the base and the wirestrip, and (F) means below the wirestrip engaging the stem and preventing separation of the cap from the base, the means being releasable to permit the cap to be separated from the base.

References Cited

UNITED STATES PATENTS

| | | | |
|---|---|---|---|
| 2,469,754 | 5/1949 | Tierney | 235—146 XR |
| 2,665,336 | 1/1954 | Saykay | 197—98 XR |
| 2,932,816 | 4/1960 | Stiefel | 235—145 XR |
| 3,129,418 | 4/1964 | De LaTour | 197—98 XR |
| 3,196,219 | 7/1965 | Gardineer | 235—145 XR |
| 3,351,817 | 11/1967 | Wadolny et al. | 235—145 XR |

OTHER REFERENCES

IBM Technical Disclosure Bulletin, vol. 9, No. 11 April 1967, P. 1523, Article by J. J. Hagopian entitled "Encoding & Self-checking Keyboard."

IBM Technical Disclosure Bulletin, vol. 8, No. 8 January 1966, p. 1064 only, Article by J. A. Taris, entitled "Keyboard."

EDGAR S. BURR, Primary Examiner

U.S. Cl. X.R.

235—145

PO-1050
(5/69)

UNITED STATES PATENT OFFICE
CERTIFICATE OF CORRECTION

Patent No. 3499515 Dated March 10, 1970

Inventor(s) MICHAEL E. MIKRUT

It is certified that error appears in the above-identified patent and that said Letters Patent are hereby corrected as shown below:

Column 2, line 7:

"prevailing" should be -- preventing --

Column 2, line 72:

"4 to" should be -- 4. To --

Column 3, line 67:

"reain" should be -- retain --

Column 4, line 67:

"and" should be -- an --

SIGNED AND
SEALED
JUL 28 1970

(SEAL)
Attest:

Edward M. Fletcher, Jr.
Attesting Officer

WILLIAM E. SCHUYLER, JR.
Commissioner of Patents